(12) United States Patent
Efimov et al.

(10) Patent No.: US 10,608,951 B2
(45) Date of Patent: Mar. 31, 2020

(54) LIVE RESEGMENTING OF PARTITIONS IN DISTRIBUTED STREAM-PROCESSING PLATFORMS

(71) Applicant: Oracle International Corporation, Redwood Shores, CA (US)

(72) Inventors: Andrey Efimov, Monroe, WA (US); John Christopher Petry, Seattle, WA (US); Julien Nicolas Dollon, Bothell, WA (US); Nathaniel Martin Glass, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 15/908,465

(22) Filed: Feb. 28, 2018

(65) Prior Publication Data

US 2019/0104082 A1    Apr. 4, 2019

Related U.S. Application Data

(60) Provisional application No. 62/566,370, filed on Sep. 30, 2017.

(51) Int. Cl.
*H04L 12/917* (2013.01)
*H04L 29/08* (2006.01)
*H04L 12/911* (2013.01)

(52) U.S. Cl.
CPC ............ *H04L 47/76* (2013.01); *H04L 47/783* (2013.01); *H04L 67/10* (2013.01); *H04L 67/1095* (2013.01)

(58) Field of Classification Search
CPC ....... H04L 47/76; H04L 47/783; H04L 67/10; H04L 67/1095; H04L 67/1097; H04L 67/2814; G06F 3/065; G06F 16/27

USPC .......................................................... 709/226
See application file for complete search history.

(56) References Cited

U.S. PATENT DOCUMENTS

| | | | |
|---|---|---|---|
| 9,432,445 B1 * | 8/2016 | Leonard .............. | H04L 67/1008 |
| 10,419,965 B1 * | 9/2019 | Kadosh ............... | H04L 61/2592 |
| 2004/0078440 A1 * | 4/2004 | Potter ..................... | G06F 9/542 |
| | | | 709/206 |
| 2006/0173899 A1 * | 8/2006 | Balayoghan ........... | G06F 16/88 |

(Continued)

OTHER PUBLICATIONS

Neha Narkhede et al., "Kafka: The Denitive Guide—Real-Time Data and Stream Processing at Scale", Jul. 2017, O'Reilly Media, Inc., book.huihoo.com/pdf/confluent-kafka-definitive-guide-complete.pdf (Year: 2017).*

*Primary Examiner* — Ruolei Zong
(74) *Attorney, Agent, or Firm* — Invoke

(57) ABSTRACT

Techniques for resegmenting a partition in a distributed stream-processing platform are provided. The techniques include receiving a trigger to move a partition of the distributed stream-processing platform from a first broker on a first set of physical resources to a second broker on a second a set of physical resources. In response to the trigger, the partition is allocated on the second broker, and the first broker is configured to redirect, to the second broker, requests for new messages after a last offset in the partition without replicating older messages before the last offset to the second broker. Idempotent produce metadata for the partition from the first broker is then merged into the second broker. Finally, metadata for processing requests for the partition is updated to include the second broker.

20 Claims, 4 Drawing Sheets

(56) References Cited

U.S. PATENT DOCUMENTS

| | | | |
|---|---|---|---|
| 2013/0086336 A1* | 4/2013 | Canepa | G06F 3/0683 |
| | | | 711/154 |
| 2015/0067135 A1* | 3/2015 | Wang | H04L 67/1002 |
| | | | 709/223 |
| 2017/0371576 A1* | 12/2017 | Liu | G06F 3/0614 |
| 2018/0089324 A1* | 3/2018 | Pal | G06F 9/5011 |
| 2018/0159795 A1* | 6/2018 | Nemeth | H04L 65/605 |

\* cited by examiner

LIVE RESEGMENTING OF PARTITIONS IN DISTRIBUTED STREAM-PROCESSING PLATFORMS

BENEFIT CLAIMS

This application claims the benefit of U.S. Provisional Patent Application 62/566,370, filed Sep. 30, 2017, which is hereby incorporated by reference.

TECHNICAL FIELD

The present disclosure relates to stream-processing platforms. In particular, the present disclosure relates to techniques for performing live resegmenting of partitions in distributed stream-processing platforms.

BACKGROUND

Stream-processing platforms such as Apache Kafka (Kafka™ is a registered trademark of the Apache Software Foundation) may be used to generate streams of messages identified by a number of topics. As a result, producers of the messages may publish information to the topics, and consumers of the information may subscribe to the topics and process the corresponding message streams. Each topic may additionally be divided into multiple partitions, with each partition containing a commit log of an ordered, immutable sequence of messages.

On the other hand, writes to an overburdened partition cannot be redirected to a new physical location for the partition without replicating all data in the partition from the old physical location to the new physical location. Because the replication process may further increase the load on the partition, the old physical location may drop requests to the partition until the replication is complete, which may negatively impact the performance of the partition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
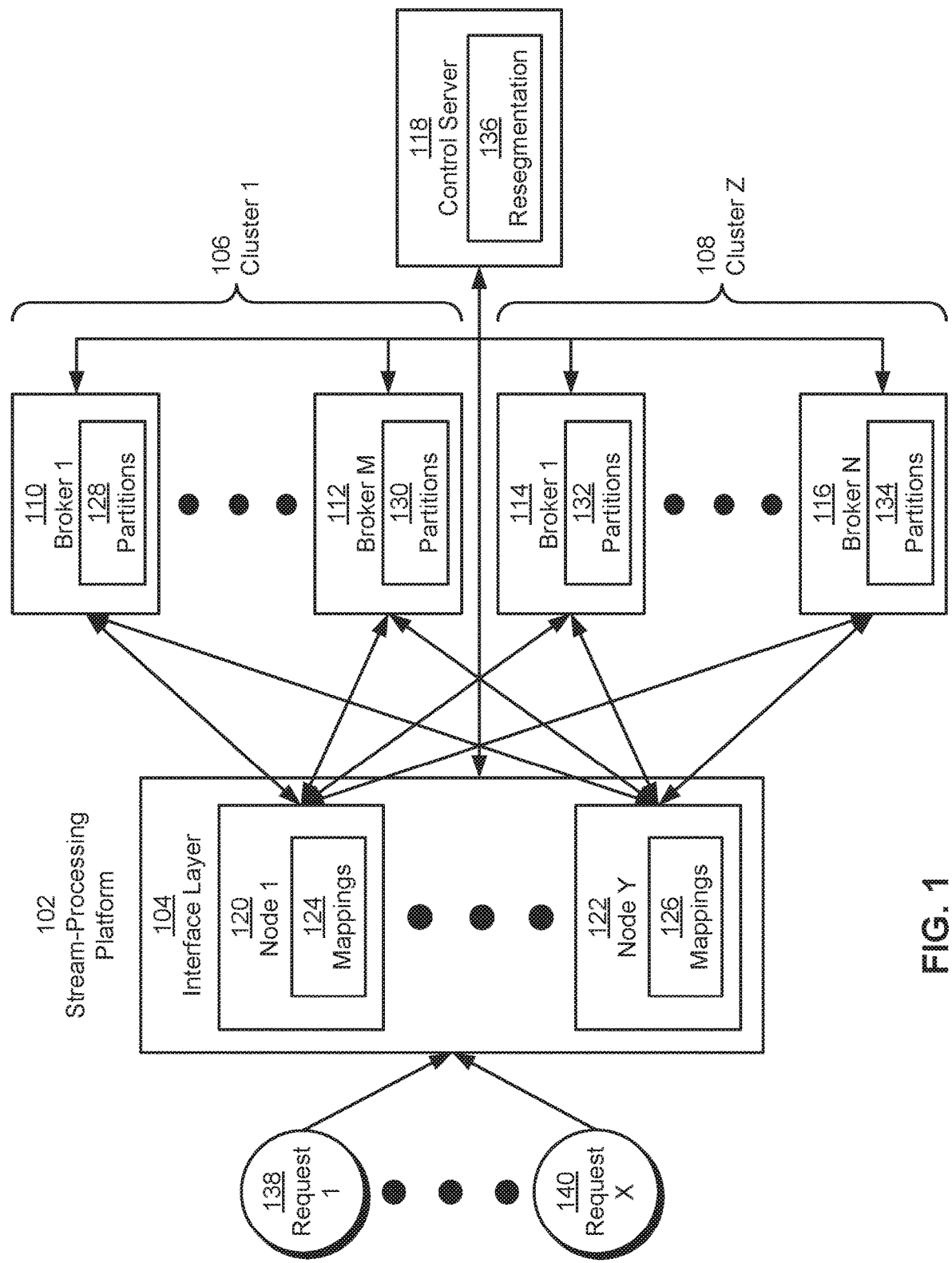
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. LIVE RESEGMENTING OF PARTITIONS IN DISTRIBUTED STREAM-PROCESSING PLATFORMS
4. EXAMPLE EMBODIMENT
5. RESEGMENTING A PARTITION IN A DISTRIBUTED STREAM-PROCESSING PLATFORM
6. COMPUTER NETWORKS AND CLOUD NETWORKS
7. MISCELLANEOUS; EXTENSIONS
8. HARDWARE OVERVIEW

1. General Overview

A distributed stream-processing platform such as Apache Kafka (Kafka™ is a registered trademark of the Apache Software Foundation) typically uses topics to identify multiple streams of messages. Messages within each topic may further be divided into multiple partitions that are managed by different brokers. In turn, each broker may process write requests from producers of the streams by appending messages in the write requests to logs representing the corresponding partitions. The broker may also process read requests from consumers of the streams by using sequential offsets that identify the messages within the logs to return the messages in response to the read requests.

When a broker is overloaded with read and/or write requests, the distributed stream-processing platform may redistribute, or resegment, one or more partitions from the broker to a different broker. Such resegmentation may be performed in a way that averts replication of existing messages from the old broker to the new broker, which may further overload the old broker. Instead, the resegmentation process allocates the partition on the new broker and subsequently redirects requests for reading from and writing to the partition from the old broker to the new broker.

During redirecting of the requests, when a write request from a producer is received, the old broker may match one or more messages in the write request to the latest sequence number for the producer in idempotent produce metadata for the partition. If the message(s) have sequence numbers that precede the producer's last sequence number in the idempotent produce metadata, the old broker may discard the write request because the message(s) have already been committed to the partition. If the message(s) have sequence numbers that exceed the producer's latest sequence number in the idempotent produce metadata, the old broker may redirect the write request to the new broker to allow the write request to be processed at the partition's new location. In turn, the new broker may write new messages after the last offset on the old broker to the partition and create a different set of idempotent produce data that tracks the latest sequence numbers of the producers at the partition's new location.

The resegmentation process then merges idempotent produce metadata from the old broker into the new broker. Once the idempotent produce metadata is merged on the new broker, the new broker may be configured to handle all subsequent write requests to the partition.

Finally, the resegmentation process updates metadata for processing and redirecting requests by nodes in an interface layer of the distributed stream-processing platform. For example, the resegmentation process may use a control stream to propagate and/or broadcast the metadata to the nodes in the interface layer. The metadata may indicate that the new broker is to be used to process all write requests and read requests for offsets after the partition's last offset on the old broker.

After the metadata is propagated to all nodes in the interface layer, the new broker may handle all write requests to the partition and all read requests for offsets after the last offset for the partition on the old broker. The old broker may continue to process read requests for old messages before the last offset in the partition during a retention period for the old messages. After the retention period has lapsed, the old broker may be torn down and/or reconfigured to process messages in other partitions, topics, and/or streams.

One or more embodiments described in this Specification and/or recited in the claims may not be included in this General Overview section.

2. Architectural Overview

FIG. 1 illustrates a system in accordance with one or more embodiments. The system includes a stream-processing platform 102 that processes a set of requests (e.g., request 1 138, request x 140) from producers and/or consumers of messages. More specifically, stream-processing platform 102 may allow streams of messages to be generated and identified by a number of topics. As a result, producers of the messages can publish information to the topics, and consumers of the information can subscribe to the topics.

For example, stream-processing platform 102 may include an Apache Kafka (Kafka™ is a registered trademark of the Apache Software Foundation) platform. The Kafka platform may be distributed across a set of physical and/or virtual machines operating as brokers (e.g., broker 1 110, broker m 112, broker 1 114, broker n 116) within one or more clusters (e.g., cluster 1 106, cluster z 108). Each broker may manage data and requests associated with messages in one or more partitions (e.g., partitions 128-134) within the topics. Thus, the broker may process write requests from the producers by appending messages in the write requests to logs representing the corresponding partitions. The broker may also process read requests from the consumers by using sequential offsets that identify the messages within the logs to return the messages in response to the read requests. By decoupling transmission of the messages from the producers from receipt of the messages by the consumers, stream-processing platform 102 may allow topics, streams, producers, and/or consumers to be dynamically added, modified, replicated, and removed without interfering with the transmission and receipt of messages using other topics, streams, producers, and/or consumers.

Stream-processing platform 102 also includes a set of nodes (e.g., node 1 120, node y 122) forming an interface layer 104 between requests to stream-processing platform 102 and brokers that process the requests. Each node in interface layer 104 may accept read and/or write requests to streams, topics, and/or partitions 128-134 from producers and consumers in stream-processing platform 102. The node may use a set of mappings 124-126 containing metadata for processing the requests to redirect the requests to brokers on which the requested partitions reside. The brokers may then execute the redirected requests by reading and/or writing messages associated with the requests in the corresponding partitions.

Stream-processing platform 102 further includes a control server 118 that provides control plane functionality in stream-processing platform 102. Control server 118 may track and/or manage the distribution of partitions 128-134 across brokers in stream-processing platform 102. As a result, control server 118 may provide and/or update mappings 124-126 that allow nodes in interface layer 104 to route requests from the producers and/or consumers to the appropriate brokers.

In one or more embodiments, the system may include more or fewer components than the components illustrated in FIG. 1. For example, interface layer 104, control server 118, the brokers, and/or the clusters may include, execute with, or exclude one another. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, partitions 128-134, collection of tables, or any other storage mechanism) for storing data. Further, the data repository may include multiple different storage units and/or devices. The multiple different storage units and/or devices may or may not be of the same type or located at the same physical site. The data repository may be implemented or may execute on the same computing system as the brokers, control server 118, and/or nodes in interface layer 104 or on a computing system that is separate from the brokers, control server 118, and/or nodes in interface layer 104. The data repository may be communicatively coupled to the brokers, control server 118, and/or nodes in interface layer 104 via a direct connection or via a network.

In one or more embodiments, stream-processing platform 102 refers to hardware and/or software configured to perform distributed processing of message streams for producers and/or consumers of the streams. Examples of such operations are described below.

In an embodiment, stream-processing platform 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Live Resegmenting of Partitions in Distributed Stream-Processing Platforms Those skilled in the art will appreciate that conventional stream-processing technologies such as Apache Kafka may lack the ability to move a partition from one broker, cluster, and/or physical location to another without replicating all messages and/or other data associated with the partition to the new physical location. When the old physical location is already overloaded with requests, such replication may cause the requests to be dropped and/or a failure in the old physical location. Consequently, attempts to offload stream processing from the old physical location to the new physical location may result in disruption of service associated with the partition.

In one or more embodiments, stream-processing platform 102 includes functionality to perform live resegmentation 136 of partitions 128 without interfering with the performance of the corresponding brokers. Live resegmentation 136 may include moving a partition from a first broker to a second broker so that messages written to the partition after the move are handled entirely by the second broker, while messages written to the partition before the move are used to process read requests by the first broker. In turn, a partition may be resegmented to balance load across the brokers, mitigate performance degradation in an overloaded broker, and/or react to or prevent failures in the brokers.

As shown in FIG. 1, control server 118 coordinates resegmentation 136 of partitions 128-134 across the brokers and/or clusters. The operation of control server 118 may be coupled with nodes in interface layer 104 of stream-processing platform 102.

In one or more embodiments, resegmentation 136 of a partition is performed in response to a trigger such as a request from a broker, administrator, or user; a change in load, an error, or a failure in a broker; and/or another condition or event. In response to the trigger, control server 118 may execute a sequence of steps to move a partition between two physical locations without transferring all messages written to the partition on the old physical location to the new physical location.

First, control server 118 may activate a new broker at the new physical location and/or allocate the partition at the new physical location. For example, control server 118 may create a new broker instance for hosting an Apache Kafka partition at the new physical location and/or create a segment file for the partition at the new physical location. The new physical location may include a different host, virtual machine, and/or set of physical resources than the old physical location.

Next, control server 118 may configure the old broker at the old physical location to redirect messages after a last offset in the partition to the new broker at the new physical location. For example, control server 118 may change the state of the old broker from processing write requests in the partition to redirecting the write requests and provide the old broker with a redirect destination (e.g., name, cluster, network location, etc.) representing the new broker. In response to the change in state, the old broker may identify the last offset in the partition as the offset of the last message written to the partition before the change in state and redirect all read and write requests for messages after the last offset to the new broker. Each redirected write request may include the last offset for the partition on the old broker. The new broker may process the redirected write requests by setting the base offset (e.g., the offset of the first message handled by the broker) of the partition to the last offset on the old broker and writing the corresponding messages to offsets after the base offset.

While write requests for the partition are redirected from the old broker to the new broker, the old and new brokers may use idempotent produce metadata associated with producers of the partition to validate the write requests, when the idempotent produce metadata is available (e.g., based on idempotent produce feature presets). The idempotent produce metadata may include a producer identifier for each producer, as well as the sequence number for the last message received from the producer. When a write request from a producer is received, the old broker may match one or more messages in the write request to the latest sequence number for the producer. If the message(s) have sequence numbers that precede the producer's last sequence number in the idempotent produce metadata, the old broker may discard the write request because the message(s) have already been committed to the partition. If the message(s) have sequence numbers that exceed the producer's latest sequence number in the idempotent produce metadata, the old broker may redirect the write request to the new broker to allow the write request to be processed at the partition's new location. In turn, the new broker may write new messages after the last offset on the old broker to the partition and create a different set of idempotent produce data that tracks the latest sequence numbers of one or more producers at the partition's new location.

Any idempotent produce metadata from the old broker may then be merged into the new broker to allow the new broker to enforce idempotency for all producers of the partition. For example, the old broker may copy producer identifiers and the corresponding latest sequence numbers in the idempotent produce metadata to the new broker. The new broker may then merge the two sets of idempotent produce data by setting the latest sequence number for each producer to be the latest sequence number (if it exists) on the new broker or the latest sequence number from the old broker (if the new broker does not have a latest sequence number for the producer). Once the idempotent produce metadata is merged on the new broker, the new broker may be configured to handle all subsequent write requests to the partition.

Consequently, data copied from the old broker to the new broker during resegmentation 136 of the partition may be limited to producer identifiers, offsets, and/or other metadata associated with producing and/or consuming messages in the partition. Because the size of the copied data is limited and scales only with the number of producers for the partition, resegmentation 136 may be performed without adversely impacting the processing of read and write requests on the old and new brokers.

Finally, control server 118 and/or another component of stream-processing platform 102 may update metadata for processing and redirecting requests by nodes in interface layer 104. For example, the component may use a control stream in stream-processing platform 102 to propagate and/or broadcast the metadata to the nodes. The metadata may indicate that the new broker is to be used to process all write requests and read requests for offsets after the partition's last offset on the old broker. The nodes in interface layer 104 may receive the metadata in an asynchronous manner (e.g., by polling for new messages from the control stream) and update mappings 124-126 with a mapping of the partition to the new broker, a cluster containing the new broker, a topic containing the partition, and/or the last offset from the old broker.

The nodes may then use the updated mappings 124-126 to selectively direct read requests for the partition to the old and/or new brokers (e.g., based on the offsets associated with the read requests) and direct all write requests for the partition to the new broker. At the same time, the old broker may continue to redirect write requests from nodes that lack updated mappings 124-126 to the new broker, thereby ensuring that the new broker is able to handle both read and write requests for messages after the partition's last offset on the old broker.

After all nodes in interface layer 104 have updated mappings 124-126 that include the new broker for the partition, the new broker may handle all write requests to the partition and all read requests for offsets after the last offset for the partition on the old broker. The old broker may continue to process read requests for old messages before the last offset in the partition during a retention period for the old messages (e.g., a certain number of hours days, and/or weeks after the messages are produced). After the retention period has lapsed, the old broker may be torn down and/or reconfigured to process messages in other partitions, topics, and/or streams.

By performing resegmentation 136 of partitions without replicating messages in the partitions across the brokers and/or clusters, stream-processing platform 102 may allow the partitions to be moved between different physical locations without interfering with processing of reads and writes to the partitions by the brokers. In turn, such live resegmentation 136 may facilitate load rebalancing, capacity management, and/or management and prevention of faults and failures in stream-processing platform 102. Consequently, the system of FIG. 1 may improve the maintenance, scalability, and use of stream-processing technologies, as well as the operation and management of computer systems on which the stream-processing technologies are deployed.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Figure 2:
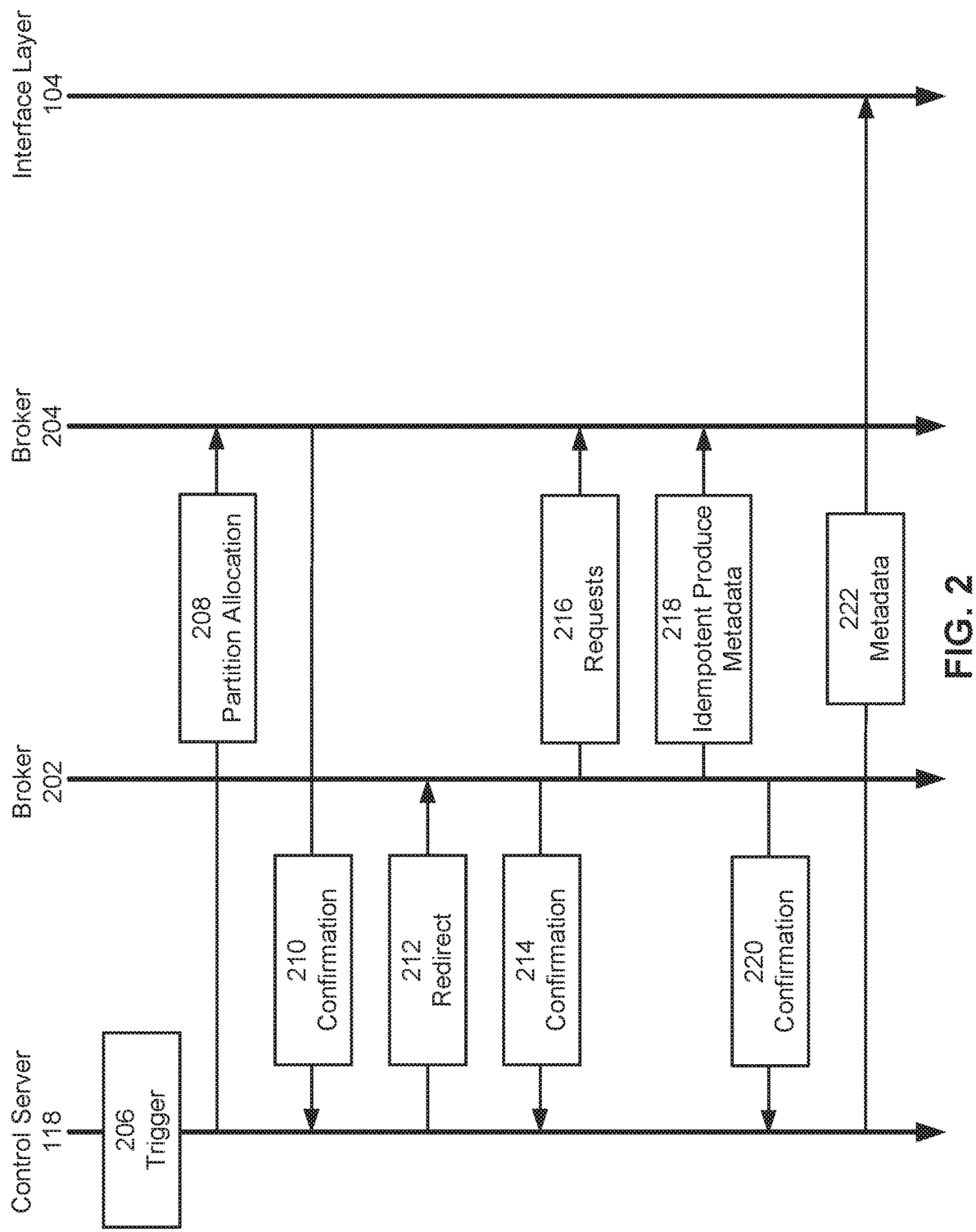
FIG. 2 illustrates an exemplary sequence of operations involved in resegmenting a partition in a distributed stream-processing platform in accordance with one or more embodiments.

FIG. 2 illustrates an exemplary sequence of operations involved in resegmenting a partition in a distributed stream-processing platform (e.g., stream-processing platform 102 of FIG. 1) in accordance with one or more embodiments. As shown in FIG. 2, resegmenting the partition is initiated after control server 118 receives a trigger 206. Trigger 206 may include a request from a broker 202 on which the partition resides, an administrator, and/or a user; a change in load, an error, or a failure in broker 202; and/or another condition or event. Trigger 206 may also, or instead, include a redistribution of load across brokers (e.g., brokers 202-204) in the distributed stream-processing platform that is achieved by moving partitions from some brokers to other brokers. The redistribution of load may be performed periodically, in response to user input, and/or based on the existing distribution of load across the brokers.

In response to trigger 206, control server 118 performs a partition allocation 208 on a new broker 204 and receives a confirmation 210 of the allocated partition from broker 202. For example, control server 118 may instantiate a new broker 204 instance for hosting an Apache Kafka partition and/or create a segment file for the partition at broker 204. After broker 204 is instantiated and/or the partition is created on broker 204, broker 204 transmits a confirmation 210 of the allocated partition to control server 118.

Next, control server 118 initiates a redirect 212 of traffic from broker 202 to broker 204. For example, control server 118 updates broker 202 with commands and/or metadata that change the state of the old broker from processing write requests in the partition to redirecting the write requests. The commands and/or metadata may also provide broker 202 with a redirect destination (e.g., name, cluster, network location, etc.) representing broker 204. After redirect 212 is implemented at broker 202, broker 202 transmits a confirmation 214 of redirect 212 to To initiate redirect 212, broker 202 identifies the last offset in the partition as the offset of the last message written to the partition before redirect 212. Next, broker 202 redirects all read and write requests 216 after the last offset to broker 204. Each redirected write request may include the last offset for the partition. Alternatively, broker 202, control server 118, and/or another component may provide the last offset to broker 202 separately from the redirected requests 216 (e.g., in a command, message, and/or another communication). Broker 204 then processes the redirected write requests 216 by setting the base offset (e.g., the offset of the first message handled by broker 204) of the partition to the last offset on broker 202. Broker 204 also writes the corresponding messages to offsets after the base offset.

Brokers 202-204 may optionally use available idempotent produce metadata associated with producers of the partition to validate and/or redirect the write requests. The idempotent produce metadata may include a producer identifier for each producer and/or the sequence number for the last message received from the producer. When broker 202 receives a write request from a producer, broker 202 matches one or more messages in the write request to the latest sequence number for the producer. If the message(s) have sequence numbers that precede the producer's last sequence number in the idempotent produce metadata, broker 202 discards the write request because the message(s) have already been committed to the partition. If the message(s) have sequence numbers that exceed the producer's latest sequence number in the idempotent produce metadata, broker 202 redirects the write request to broker 204. In turn, broker 204 writes new messages after the last offset on broker 202 to the partition. Broker 204 also creates a different set of idempotent produce data that tracks the latest sequence numbers of the producers at the partition's new location.

Broker 202 subsequently copies its set of idempotent produce metadata 218 containing producer identifiers and the corresponding latest sequence numbers to broker 204. Broker 202 then merges the copied set of idempotent produce metadata 218 with its own set of idempotent produce data by setting the latest sequence number for each producer to the latest sequence number (if it exists) on broker 204 or the latest sequence number from broker 202 (if broker 204 does not have a latest sequence number for the producer).

Once the idempotent produce metadata is merged on broker 204, broker 204 transmits a confirmation 220 to control server 118 indicating that broker 204 is configured to handle all subsequent write requests to the partition. Finally, control server 118 broadcasts and/or transmits metadata 222 to nodes in interface layer 104. The transmitted metadata 222 may indicate that broker 204 is to be used to process all write requests and read requests for offsets after the partition's last offset on broker 202. Nodes in interface layer 104 individually receive metadata 222 from control server 118.

Each node uses metadata 222 to create a mapping of the partition to broker 204, a cluster to which broker 204 belongs, a topic containing the partition, and/or the last offset from broker 202. The node then uses the mapping to selectively direct read requests for the partition to brokers 202-204 (based on the offsets associated with the read requests and the last offset from broker 202). On the other hand, the node directs all write requests for the partition to broker 204. Broker 202 continues to redirect write requests from nodes that lack the mapping to broker 204, thereby allowing broker 204 to handle both read and write requests for messages after the partition's last offset on broker 202.

Once every node in interface layer 104 has a mapping indicating that the partition resides on broker 204, broker 204 handles all write requests to the partition and all read requests for offsets after the last offset for the partition on broker 202. Broker 202 continues to process read requests for old messages before the last offset in the partition during a retention period for the old messages. After the retention period has lapsed, broker 202 may be torn down and/or reconfigured to process messages in other partitions, topics, and/or streams.

5. Resegmenting a Partition in a Distributed Stream-Processing Platform

Figure 3:
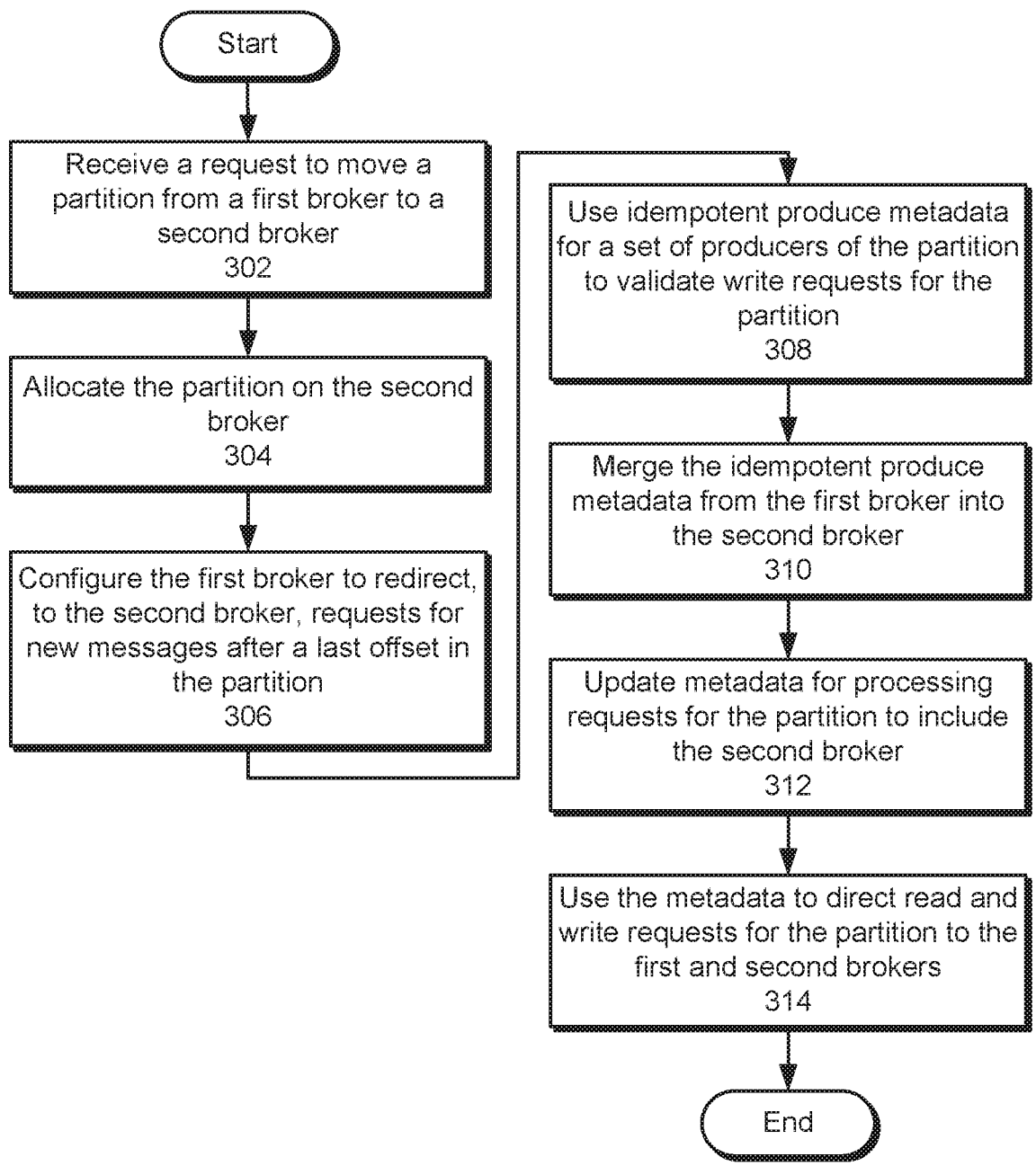
FIG. 3 illustrates a flowchart of resegmenting a partition in a distributed stream-processing platform in accordance with one or more embodiments.

FIG. 3 illustrates a flowchart of resegmenting a partition in a distributed stream-processing platform in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, component in the distributed stream-processing platform receives a trigger to move a partition from a first broker to a second broker (operation 302). The trigger may be generated in response to a request from the first broker or a user and/or a change in load or state on one or more brokers. In response to the trigger, the component allocates the partition on the second broker (operation 304). For example, the partition may be allocated on one or more segment files in the second broker. Prior to allocating the partition, the second broker may optionally be activated and/or instantiated on a set of physical resources (e.g., machine, processors, memory, etc.) that is separate from the physical resources on which the first broker resides.

Next, the component configures the first broker to redirect requests for new messages after a last offset in the partition to the second broker (operation 306). For example, the first broker may be updated to have a redirect state and a redirect destination representing the second broker. In response to the update, the first broker may determine the last offset as the offset of the last message written to the partition prior to the update. The first broker may then transmit, with each request redirected to the second broker, the last offset in the partition for use in setting a base offset for the partition in the second broker. Such redirection of requests may be performed without replicating older messages before the last offset to the second broker.

After the first broker is configured to redirect requests to the second broker, the first broker continues using idempotent produce metadata for the partition to validate write requests for the partition (operation 308). For example, the first broker may use the idempotent produce metadata to discard write requests that have already been committed to the partition on the first broker and redirect write requests that have not been committed to the partition on the first broker to the second broker. If no idempotent produce metadata is available, operation 308 may be omitted.

The idempotent produce metadata from the first broker is then merged into the second broker (operation 310), when the idempotent produce data is available. For example, the first broker may transmit, for each producer of the partition, a producer identifier and a latest sequence number received from the producer. The second broker may merge the idempotent produce metadata from the first broker with a local copy of the idempotent produce metadata by setting the latest sequence number for a given producer to a value from the first broker's idempotent produce metadata, when the latest sequence number does not exist in the local copy. After the idempotent produce metadata is merged into the second broker, the second broker may be configured to handle all write requests to the partition.

Finally, the component updates metadata for processing requests for the partition to include the second broker (operation 312). The component also uses the metadata to direct read and write requests for the partition to the first and second brokers (operation 314). For example, the metadata may be updated with a mapping from an identifier for the partition to the second broker, a cluster containing the second broker, a topic containing the partition, and/or the last offset of the partition on the first broker. A stream in the distributed stream-processing platform and/or another broadcast mechanism may be used to propagate the metadata to a set of interface nodes in the distributed stream-processing platform. In turn, the interface nodes may use the updated metadata to direct all write requests for the partition to the second broker, read requests for messages before the last offset to the first broker, and read requests for messages after the last offset to the second broker. The first broker may continue to be used to process read requests for old messages before the last offset during a retention period for the old messages.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
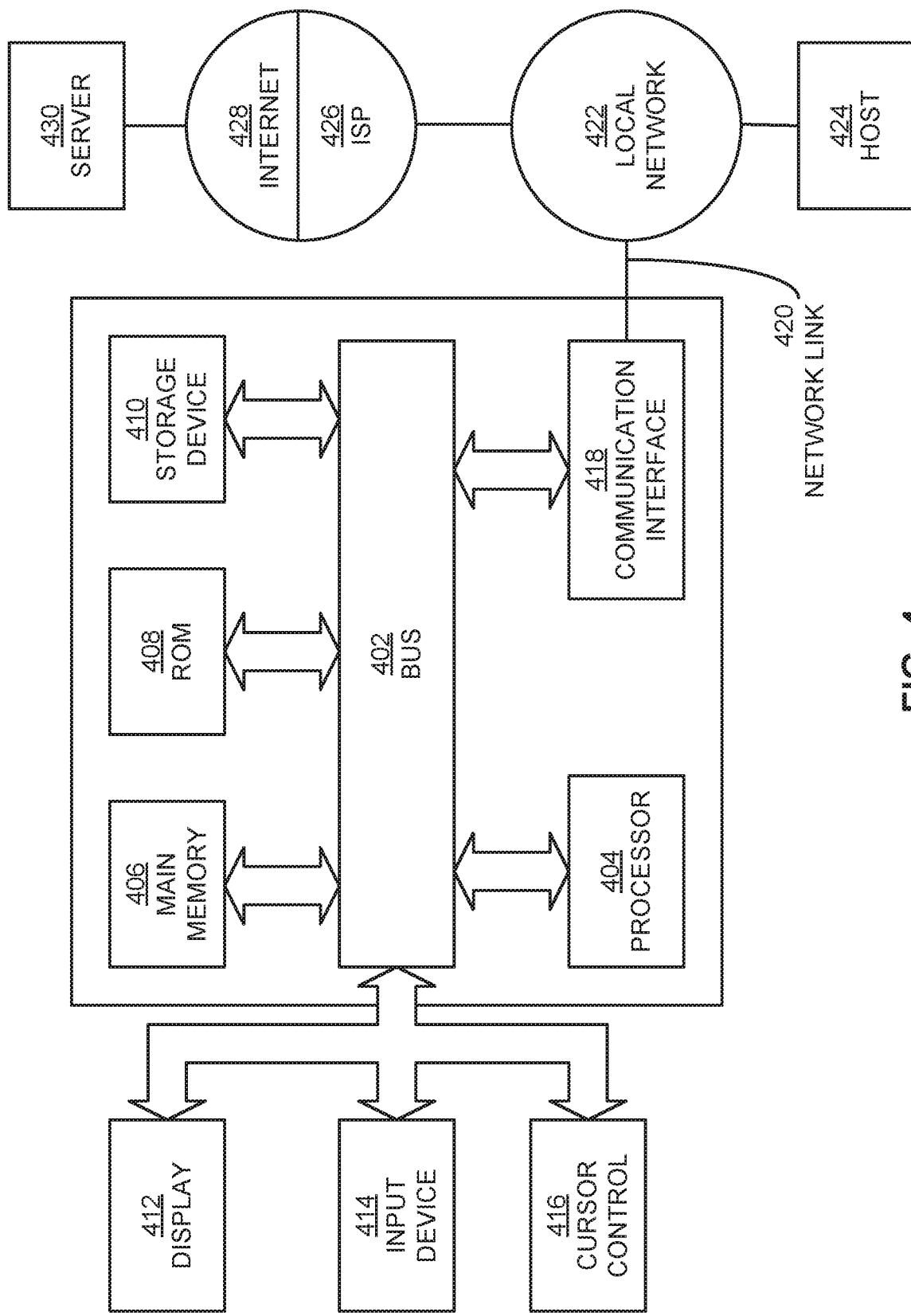
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, optical tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

upon receiving a trigger to move a partition of a distributed stream-processing platform from a first broker on a first set of physical resources to a second broker on a second a set of physical resources, allocating the partition on the second broker;

configuring the first broker to redirect, to the second broker, requests for new messages after a last offset in the partition without replicating older messages before the last offset to the second broker; and updating metadata for processing requests for the partition to include the second broker.

2. The medium of claim 1, wherein the operations further comprise:

merging idempotent produce metadata for the partition from the first broker into the second broker after the first broker is configured to redirect the requests for the new messages after the last offset in the partition to the second broker.

3. The medium of claim 2, wherein the operations further comprise:

using the idempotent produce metadata to validate, at the first broker, write requests for the partition prior to merging the idempotent produce data from the first broker into the second broker.

4. The medium of claim 2, wherein the idempotent produce metadata comprises:

a producer identifier for a producer; and a latest sequence number for the producer.

5. The medium of claim 1, wherein the operations further comprise:

configuring the first broker to process read requests for old messages before the last offset in the partition during a retention period for the old messages.

6. The medium of claim 1, wherein the operations further comprise:

using the metadata to direct read and write requests for the partition to the first and second brokers.

7. The medium of claim 1, wherein configuring the first broker to redirect the requests for the new messages after the last offset in the partition to the second broker comprises:

updating the first broker with a redirect state and a redirect destination representing the second broker.

8. The medium of claim 1, wherein redirecting the requests for the new messages after the last offset in the partition to the second broker comprises:

transmitting, with a request redirected to the second broker, the last offset in the partition for use in setting a base offset for the partition in the second broker.

9. The medium of claim 1, wherein updating the metadata for processing requests for the partition to include the second broker comprises:

using a stream in the distributed stream-processing platform to propagate the metadata to a set of interface nodes in the distributed stream-processing platform.

10. The medium of claim 1, wherein the trigger is received in response to a change in load on the first broker.

11. The medium of claim 1, wherein the metadata further comprises a cluster, a topic, and the last offset.

12. A method, comprising:
upon receiving a trigger to move a partition of a distributed stream-processing platform from a first broker on a first set of physical resources to a second broker on a second a set of physical resources, allocating the partition on the second broker;
configuring, by a computer system, the first broker to redirect, to the second broker, requests for new messages after a last offset in the partition without replicating older messages before the last offset to the second broker; and
updating metadata for processing requests for the partition to include the second broker.

13. The method of claim 12, further comprising:
merging idempotent produce metadata for the partition from the first broker into the second broker after the first broker is configured to redirect the requests for the new messages after the last offset in the partition to the second broker; and
using the idempotent produce metadata to validate, at the first broker, write requests for the partition prior to merging the idempotent produce data from the first broker into the second broker.

14. The method of claim 13, wherein the idempotent produce metadata comprises:
a producer identifier for a producer; and
a latest sequence number for the producer.

15. The method of claim 12, further comprising:
configuring the first broker to process read requests for old messages before the last offset in the partition during a retention period for the old messages.

16. The method of claim 12, further comprising:
using the metadata to direct read and write requests for the partition to the first and second brokers.

17. The method of claim 12, wherein configuring the first broker to redirect the requests for the new messages after the last offset in the partition to the second broker comprises:
updating the first broker with a redirect state and a redirect destination representing the second broker.

18. The method of claim 12, wherein redirecting the requests for the new messages after the last offset in the partition to the second broker comprises:
transmitting, with a request redirected to the second broker, the last offset in the partition for use in setting a base offset for the partition in the second broker.

19. An apparatus, comprising:
one or more processors; and
memory storing instructions that, when executed by the one or more processors, cause the apparatus to:
upon receiving a trigger to move a partition of a distributed stream-processing platform from a first broker on a first set of physical resources to a second broker on a second a set of physical resources, allocate the partition on the second broker;
configure the first broker to redirect, to the second broker, requests for new messages after a last offset in the partition without replicating older messages before the last offset to the second broker; and
update metadata for processing requests for the partition to include the second broker.

20. The apparatus of claim 19, wherein the memory further stores instructions that, when executed by the one or more processors, cause the apparatus to:
merge idempotent produce metadata for the partition from the first broker into the second broker after the first broker is configured to redirect the requests for the new messages after the last offset in the partition to the second broker.

* * * * *

UNITED STATES PATENT AND TRADEMARK OFFICE
CERTIFICATE OF CORRECTION

PATENT NO. : 10,608,951 B2
APPLICATION NO. : 15/908465
DATED : March 31, 2020
INVENTOR(S) : Efimov et al.

It is certified that error appears in the above-identified patent and that said Letters Patent is hereby corrected as shown below:

On the Title Page

Item (56), Column 2, under Other Publications, Line 1, delete "Denitive" and insert -- Definitive --, therefor.

Item (57), Column 2, under Abstract, Line 6, delete "second a" and insert -- second --, therefor.

In the Specification

In Column 8, Line 6, after "to" insert -- control server 118. --.

In the Claims

In Column 16, in Claim 1, Line 15, delete "second a" and insert -- second --, therefor.

In Column 17, in Claim 12, Line 7, delete "second a" and insert -- second --, therefor.

In Column 18, in Claim 19, Line 19, delete "second a" and insert -- second --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*